No. 80,162.  PATENTED JULY 21, 1868.
L. FULTON.
LOW WATER INDICATOR FOR STEAM GENERATORS.
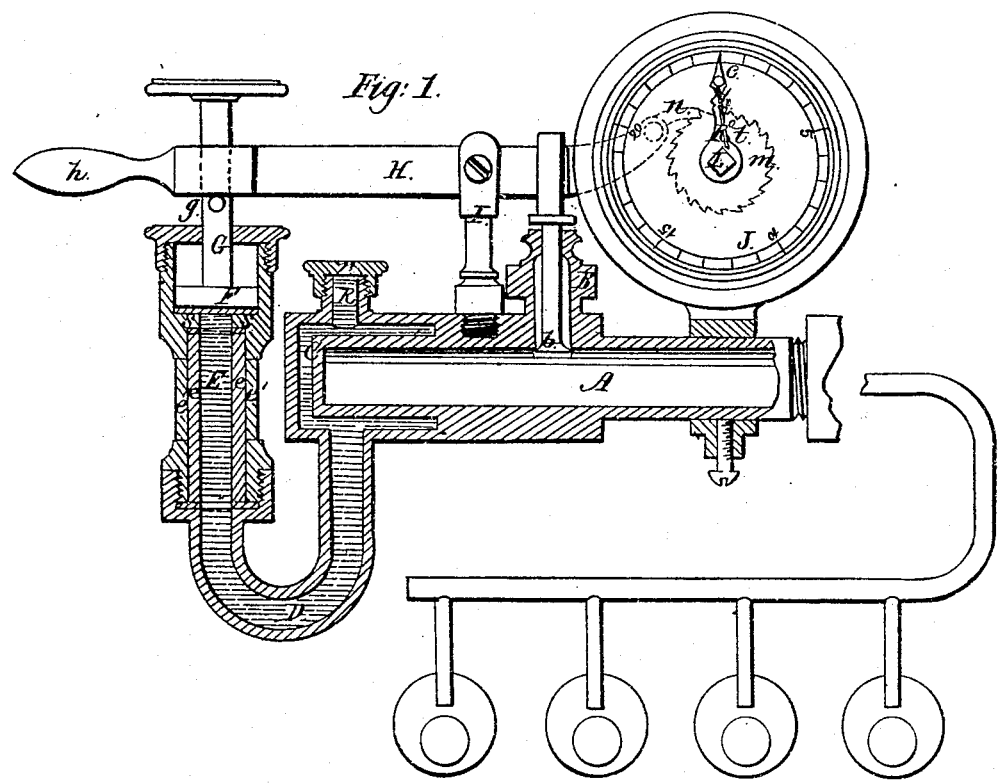
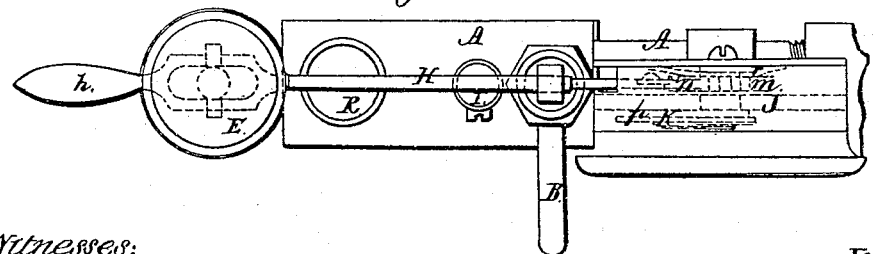
Witnesses:
Chas. A. Pettis
Solon C. Kemon
Inventor:
Lorenzo Fulton

United States Patent Office.

LORENZO FULTON, OF EDINBURG, INDIANA.

Letters Patent No. 80,162, dated July 21, 1868.

---

IMPROVEMENT IN LOW-WATER INDICATORS FOR STEAM-GENERATORS.

---

The Schedule referred to in these Letters Patent and making part of the same.

---

TO ALL WHOM IT MAY CONCERN:

Be it known that I, LORENZO FULTON, of Edinburg, in the county of Johnson, and State of Indiana, have invented a new and improved Low-Water Reporter; and I do hereby declare the following to be a full, clear, and exact description of the same, sufficient to enable others skilled in the art to which my invention appertains to fully understand and use it, reference being had to the accompanying drawings, forming part of this specification, and in which—

Figure 1 is a longitudinal vertical section.

Figure 2 is a top view.

The object of this invention is to furnish a simple, cheap, and accurately-operating device, which will indicate the fall of the water below its proper and safe level in the boiler, and which will also indicate the careening of the boat to such a degree as to improperly heat the sides of the boiler, and which, besides sounding an alarm at the time, will correctly record the fact that an alarm was given, by means of a dial, index, and marking-pencil.

In the drawings, A indicates a steam-pipe; B, an offset-pipe from it, closed by a valve, $b$, seating upward; C, a water-space, around the end of the steam-pipe A, connected by a bent tube, D, with a vessel, E, in the upper end of which is a piston, F; G, the piston-rod or stem; H, a lever, operated by the piston-rod; I, the fulcrum of the lever H; J, the dial-plate, having a graduated and numbered circle around its edge; K, an index, supported by a spindle, L, and operated by the lever H, by means of a ratchet-wheel, $m$, on the spindle behind the dial-plate, and a short jointed dog or tooth, $n$, hinged to the end of lever H, and pressing against the teeth of the ratchet, whenever the piston-rod G is thrown up far enough to raise the outer end of the lever, in such a manner as to turn the ratchet, spindle, and index one degree of the dial. The index is also provided with a socket, $o$, which holds a pencil, $p$, the end of which presses on the dial, tracing a mark thereon whenever the index-hand is moved. R is a tube, covered by a screw-cap or plug, $r$, for the purpose of filling the space C, pipe D, and vessel E with water.

The main portion of the vessel E is provided with glass walls or windows $e\ e$, through which the condition of the water within can be observed at a glance by the engineer. These walls may be supported by standards $e'\ e'$, of brass.

The piston does not come down in contact with the water, but seats upon an annular ledge, $s$, so as to leave a steam-space under it, between it and the water.

The stem of valve $b$ is attached to the lever H, on the side of the fulcrum opposite to that on which the piston operates, so that as the piston raises the longer arm of the lever H, it opens the valve $b$, and allows the steam in pipe A to escape through the branch-pipe B to a whistle, and thus to sound the alarm.

This apparatus, thus constructed, I attach either to the boiler or to a steam-pipe, which connects with the different boilers, when more than one are employed.

The red lines of fig. 1 represent the boilers of a steamboat, arranged longitudinally with the boat, and each connected by a short pipe with the main pipe, into which the end of the tube A screws. The short pipes pass down through the shell of the boilers, terminating just below low-water mark, so that if the water falls to a dangerous level, or if the boat careens so as to throw the water down to one side of the boiler, and allow the other side to become red hot, and thereby render an explosion imminent, the water will sink below the end of the tubes, and the superheated steam will pass into them, and through them to the tube A. As soon as it fills this tube, it will cause the water in the space C to boil, the steam from which will raise piston F and lever H, and thereby depress the valve $b$, and sound the alarm.

At the same time that the alarm is sounded, the movement of lever H throws the end of the dog $n$ forward against the tooth of the ratchet, and turns the latter forward one degree, which movement of the index will be traced by the pencil $p$ upon the dial.

It is my design to carry the pipe B from the instrument above described to the cabin, officers' state-rooms, or engineer's room, and allow it blow off, or sound a whistle there, so that the officers of the vessel shall become at once acquainted with the fact that the boat must be "trimmed" immediately to prevent an explosion.

The lever H may be provided with a handle, $h$, so that it can, if necessary, be operated by hand. The piston-rod passes through a slot in the lever, and moves the latter by means of a small pin or shoulder, $g$, which comes against the under edge of the lever, and lifts it when the piston itself is raised sufficiently.

The dial is enclosed in a suitable case, J, which can be opened for the purpose of removing the paper plate or tablet on which the pencil marks, or for the purpose of removing or sharpening the pencil itself.

In order to hold the hand K steady, a spring, $t$, may be made to press against the ratchet $m$ behind, so as to make it move with considerable friction.

The whole instrument is simple, and can be manufactured and applied at a very moderate cost. Its operation is certain and accurate, invariably conveying instant and correct intelligence of the dangerous condition of the boilers.

Having thus described my invention, what I claim as new, and desire to secure by Letters Patent, is—

1. The combination, with a low-water indicator, or any equivalent therefor, of a marker, of any suitable form, and recording-plate, or its equivalent, when all combined and arranged together, substantially as and for the purpose described.

2. The combination of the dial J, index K, pencil $p$, pawl $n$, and ratchet-wheel $m$, whereby to register successively the occurrence of an inadequate amount of water in the steam-generator, substantially as set forth.

3. The combination of the pipes A and B with the valve $b$, water-space C, pipe D, vessel E, piston F, rod G, lever H, pawl $n$, ratchet-wheel $m$, index K, and dial J, substantially as described.

4. The combination of the vessel E, having the ledge S, and the glass walls $e\ e$, with the piston F, substantially as described.

LORENZO FULTON.

Witnesses:
SOLON C. KEMON,
CHAS. A. PETTIT.